Sept. 29, 1925.

G. H. FOSTER 1,555,242

JOINING MEANS FOR WOODWORK

Filed April 28, 1925

Inventor:
George H. Foster,
By his Attorney John O. Seifert

Patented Sept. 29, 1925.

1,555,242

UNITED STATES PATENT OFFICE.

GEORGE HUGH FOSTER, OF MARRICKVILLE, NEAR SYDNEY, NEW SOUTH WALES, AUSTRALIA.

JOINTING MEANS FOR WOODWORK.

Application filed April 28, 1925. Serial No. 26,348.

*To all whom it may concern:*

Be it known that I, GEORGE HUGH FOSTER, a subject of the King of Great Britain, residing at Marrickville, near Sydney, in the State of New South Wales, Commonwealth of Australia, have invented new and useful Improvements in Jointing Means for Woodwork, of which the following is a specification.

This invention relates to improvements in jointing means and particularly to jointing or fastening means of the kind wherein expansible dowels or trenails are used. The invention is applicable for fastening together the parts of timber structures, for jointing the frames and integers of household and office furniture and for use in cabinet work and the like wherein concealed and specially neat joints are required. The invention is also suitable for jointing floor boards and for securing the sides and ends of vats, troughs and other receptacles for holding liquids.

An object of the invention is to provide improved jointing means according to which the joints obtained will be stronger and neater than those obtainable by well-known existing methods and the jointing is effected in such manner as will ensure economy of time, labor and production costs.

According to the invention holes having enlarged ends are first formed in the work-pieces to be jointed or fastened together, and expansible dowels or trenails having expanding pins fitted in holes at their opposite ends are inserted into said holes. The dowels or trenails are then driven tightly into said holes in the work-pieces to cause the expanding pins to be forced tightly into the holes in said dowels, and expand the ends of said dowels into the enlarged ends of said holes in the work-pieces, the amount of such expansion being pre-determined by the size of the said expanding pins. Between the inner ends of the holes in the opposite ends of the dowels or trenails there are provided solid portions which are adapted to register with the junction point of the two work-pieces when the joint is completed to increase its strength.

Reference is now made to the accompanying drawings, wherein:—

Figure 1:
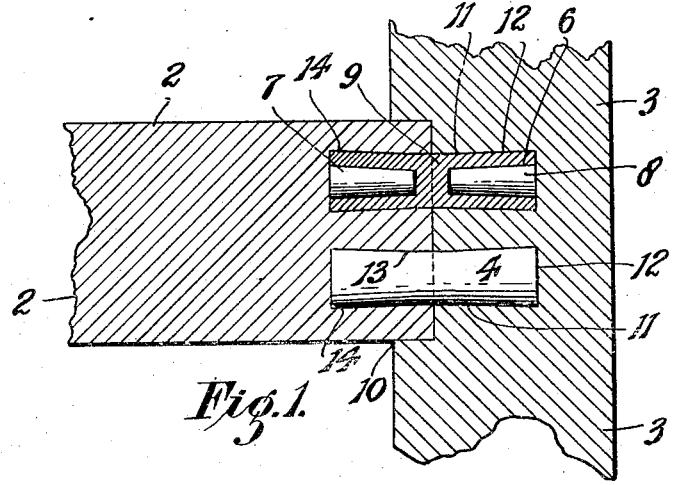
Figure 1 is a view in section showing two work-pieces jointed or fastened together according to the invention.
Figure 2:
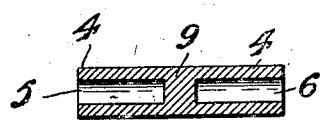
Figure 2 is a sectional view of one of the expansible dowels or trenails used in the invention.
Figure 3:
Figure 3 is a detail view of one of the dowel expanding pins.

In these views 2 and 3 indicate the two work-pieces required to be jointed or fastened together. According to the invention there are provided expansible dowels or trenails 4 constructed for a pre-determined amount of expansion, which are formed of wood and are preferably of cylindrical shape, each having holes 5 and 6 formed at their opposite ends to receive expanding pins 7 and 8, respectively. The inner ends of the holes 5 and 6 in each dowel are separated from each other by a solid portion 9 provided at the centre of the dowel. The expanding pins 7 and 8 are also formed of wood and they are of slightly tapering shape.

In use, a recess 10 is first formed in the work-piece 3, and holes 11 are bored in said recess in spaced arrangement. These holes are of uniform diameter for portion of their length and they have enlarged or expanded ends 12, which may be produced by the use of expansible boring tools or augers. Holes 13 similar in shape to the holes 11 and also having expanded ends 14 are bored in the end of the work-piece 2 in correlation to the holes 11 in the work-piece 3.

The tapered expanding pins 7 are then loosely fitted into the holes 5 in the expansible dowels or trenails 4 and said dowels or trenails then inserted into the holes 13 in the end of the work-piece 2. The dowels are driven tightly into said holes to cause the tapered pins 7 to be forced into the holes 5 and thus expand the ends of said dowels or trenails into the enlarged or expanded ends 14 of said holes. The tapered expanding pins 8 are then loosely inserted into the holes 6 in the opposite ends of the dowels or trenails 4 and the end of the work-piece 2 fitted into the recess 10 in the work-piece 3 so that said dowels or trenails fit into the holes 11. The work-piece 2 is then driven tightly into the recess 10, so that the pins 8 are forced into the holes 6 causing the ends of said dowels or trenails to be expanded into the enlarged ends 12 of the holes 11, the said pins and dowels being formed for a pre-determined amount of expansion as before-mentioned. A very rigid strong and efficient locking joint is thus obtained between the work-pieces 2 and 3, and as said expansible dowels or trenails 4 are entirely concealed from view the joint produced is particularly neat in appearance.

It will be seen that when the joint is completed the solid portions 9 of the dowels are in alignment with the junction point of the two work-pieces 2 and 3, so that the dowels will be able to withstand very severe shocks and strains without breaking. By this means specially strong joints are obtained.

Figure 4:
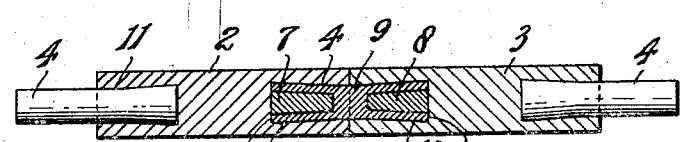
Figure 4 is a sectional view showing how the invention is used for butt jointing such as in the construction of vats and troughs or in fastening flooring boards.

Figure 4 illustrates the application of the invention to butt jointing such as is used in the fastening and jointing together of flooring boards, or in the construction of vats, troughs and like receptacles for holding liquids. In this form of the invention the two work-pieces 2 and 3 are jointed together edge to edge thus forming a joint which is liquid-tight and specially strong.

Figure 5:
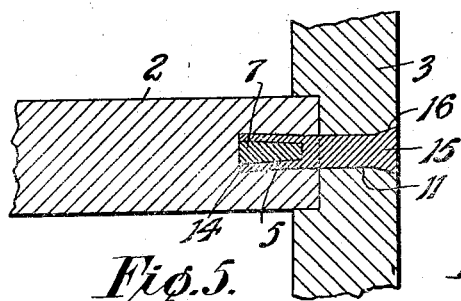
Figure 5 is a sectional view illustrating a modification of the invention.

In the modified embodiment of the invention illustrated in Figure 5, a single expansible dowel or trenail is used, and it is constructed having a hole 5 at its inner end and an enlarged head 15 at its outer end to fit into the counter-sunk end 16 of the hole 11. In this modification of the invention the dowel or trenail 4 is inserted through the open end of the hole 11 and is driven tightly into the hole 13 to cause the tapered pin 7 to expand its end into the enlarged portion of said hole 13 and to a pre-determined amount of expansion as previously described herein.

What I do claim is:—

In jointing and fastening means for work-pieces in woodwork and the like, consisting in the arranging of holes in the work-pieces in opposed and mating edges with the inner portions of the holes enlarged, providing dowels of pliable material of the same cross sectional dimension for the entire length and substantially of the same cross sectional area as the smallest cross sectional area of the holes in the work-pieces to be joined together, and having bores of the same cross sectional dimension throughout extending into the ends thereof with a solid portion of the dowel at the end of the bores, and tapered pins to be engaged directly in said dowel bores, said dowels with the pins started in the bores thereof being inserted into the holes into the work-pieces and the dowels driven into said holes and the pins into the bores in said dowels to expand the wall about the dowel bore for the entire area thereof in an intimate engagement with the wall of the enlarged ends of said holes in the work-pieces by urging the work-pieces in a direction toward each other.

In testimony whereof I affix my signature.

GEORGE HUGH FOSTER.